US008260076B1

(12) United States Patent
Yang et al.

(10) Patent No.: US 8,260,076 B1
(45) Date of Patent: Sep. 4, 2012

(54) CONSTANT TIME FILTERING

(75) Inventors: Qingxiong Yang, Urbana, IL (US); Kar-Han Tan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 12/415,962

(22) Filed: Mar. 31, 2009

(51) Int. Cl.
*G06K 9/40* (2006.01)
*G06F 17/10* (2006.01)
*H04B 1/10* (2006.01)

(52) U.S. Cl. .................. 382/261; 708/300; 375/350
(58) Field of Classification Search .................. 382/260, 382/261, 274, 275, 299, 305, 312, 285; 708/300; 375/350
See application file for complete search history.

(56) References Cited

U.S. PATENT DOCUMENTS

| | | | | |
|---|---|---|---|---|
| 7,352,911 | B2 * | 4/2008 | Maurer .................. | 382/260 |
| 7,436,999 | B2 * | 10/2008 | Ohmi et al. .................. | 382/170 |
| 7,835,586 | B2 * | 11/2010 | Porikli .................. | 382/260 |
| 7,889,949 | B2 * | 2/2011 | Cohen et al. .................. | 382/299 |
| 8,081,836 | B2 * | 12/2011 | Porikli .................. | 382/261 |

OTHER PUBLICATIONS

Bennett, Eric P., et al., "Multispectral Bilateral Video Fusion", *IEEE Transactions on Image Processing*, vol. 16, No. 5, (May 2007),1185-1194.
Bennett, Eric P., et al., "Video Enhancement Using Per-Pixel Virtual Exposures", *Siggraph*, vol. 24, (2005),845-852.
Buades, A. et al., "A Review of Image Denoising Algorithms, With a New One", *Multiscale Modeling and Simulation*. vol. 4, No. 2., (2005),490-530.
Chen, Jiawn et al., "Real-Time Edge-Aware Imathe Processing with the Bilateral Grid", *ACM Transactions on Graphics*, vol. 26, No. 3, Article 103, (Jul. 2007),103-1-103-9.
Crow, Franklin C., "Summed-Area Tables for Texture Mapping", *Computer Graphics*, vol. 18, No. 3, (Jul. 1984),207-212.
Durand, Fredo et al., "Fast Bilateral Filtering for the Display of High-Dynamic-Range Images", *Siggraph*. vol. 21, (2002),257-266.
Elad, Michael "On the Origin of the Bilateral Filter and Ways to Improve It", *IEEE Transactions on Image Processing*. vol. 11, No. 10, (Oct. 2002),1141-1151.
Oh, Byong M., et al., "Image-Based Modeling and Photo Editing", *Siggraph*, (2001),1-10.
Paris, Sylvain et al., "A Fast Approximation of the Bilateral Filter using a Signal Processing Approach", *Massachusetts Institute of Technology Computer Science and Artificial Intelligence Laboratory*, (2006),1-12.
Petschnigg, Georg et al., "Digital Photography with Flash and No-Flash Image Pairs", *Siggraph*. vol. 23, (2004),1-9.
Pham, Tuan Q., et al., "Separable Bilateral Filtering for Fast Video Preprocessing", *International Conference on Multimedia and Expo*, (2005),1-4.
Porikli, Faith "Constant Time O(1) Bilateral Filtering", *Mitsubishi Electric Research Laboratories*, Cambridge, MA, (2006),1-8.
Ramanath, Rajeev et al., "Adaptive demosaicking", *Journal of Electronic Imaging*. vol. 12 No. 4, (Oct. 2003),633-642.

(Continued)

*Primary Examiner* — Kanjibhai Patel

(57) ABSTRACT

A system for filtering an image using a bilateral filter includes a receiver and a bilateral filter. The receiver is for receiving an image having a plurality of pixels. The bilateral filter is run in constant time and comprises a pixel value range determinor and a spatial filter. The pixel value range determinor is configured to determine a range of pixel values of the plurality of pixels. The spatial filter is configured to spatially filter at least one of the plurality of pixels. The spatial filter is further configured to perform over a plurality of pixel values in the range of pixel values.

20 Claims, 3 Drawing Sheets

OTHER PUBLICATIONS

Sand, Peter et al., "Particle Video: Long-Range Motion Estimation using Point Trajectories", *ECCV*, (2006),1-8.

Tomasi, C. et al., "Bilateral Filtering for Gray and Color Images", *IEEE International Conference on Computer Vision*, Bombay, India, (1998),1-8.

Viola, Paul et al., "Robust Real-Time Face Detection", *International Journal of Computer Vision*, (2004),137-154.

Weiss, Ben "Fast Median and Bilateral Filtering", *Siggraph*. vol. 26, (2007),519-526.

Winnemoller, Holger et al., "Real-Time Video Abstraction", *Siggraph*. vol. 25, (2006),1221-1226.

Wong, Wilbur C., "Trilateral Filtering for Biomedical Images", *International Symposium on Biomedical Imaging*, (2004),820-823.

Xiao, Jiangjian et al., "Bilateral Filtering-based Optical Flow Estimation with Occlusion Detection", *ECCV*, (2006),1-14.

Yang, Qingxiong et al., "Spatial-Depth Super Resolution for Range Images", *CVPR*, (2007),1-8.

Yang, Qingxiong "Stereo Matching with Color-Weighted Correlation, Hierarchical Belief Propagation and Occlusion Handling", *CVPR*, (2006),2347-2354.

Yoon, Kuk-Jin et al., "Adaptive Support-Weight Approach for Correspondence Search", *IEEE Transactions on Pattern Analysis and Machine Intelligence*. vol. 28, No. 4, (Apr. 2006),650-656.

\* cited by examiner ent invention.

CONSTANT TIME FILTERING

FIELD

Embodiments of the present technology relates generally to the field of image processing.

BACKGROUND

In the field of image processing, it is often desirable to filter out noise in an image. A goal in image filtering is to smooth out small details in the image without removing salient features of the image. For example, a spatial filter may be applied to an image to filter out noise, however, the spatial filter may remove salient features such as, but not limited to, edges.

Properly filtering an image without removing edges requires an edge preserving filter, such as, but not limited to, a bilateral filter. An edge preserving filter can be employed to properly filter out noise in an image while also retaining edges. A bilateral filter may be an ideal image filter to preserve edges in an image, however, the bilateral filter can have high computational intensity. For example, if the kernel size(s) in a bilateral filter increases, then the computational intensity also increases. Moreover, if a bilateral filter is employed to filter numerous frames of a video, the computational intensity will increase even further.

Figure 1:
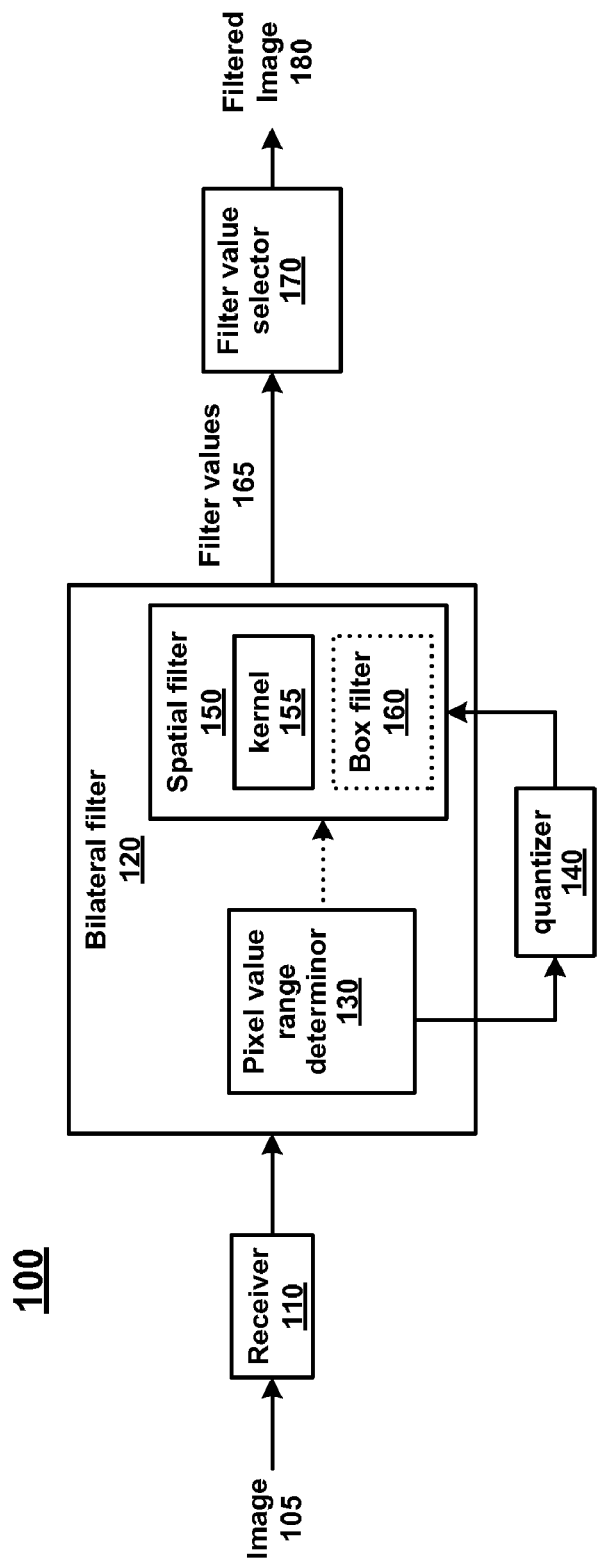
FIG. 1 illustrates an example of a bilateral filter, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Image processing, such as computer vision and graphics tasks, often requires image filtering. Image processing generally requires a lot of computational intensity. A simple image filter, such as a spatial filter, applied to a single image frame may not require a lot of computational intensity. However, if it is required that an image be filtered with edge preservation, a more complex image filter must be employed, which in turn increases the computational intensity. Furthermore, if multiple image frames are required to be filtered with edge preservation, the computational intensity increases even further. The drawbacks of an edge preserving filter are readily apparent when an edge preserving filter is applied to a video. For example, a bilateral filter does not perform in real-time or in constant-time with respect to filter size because of high computational intensity. In other words, if a bilateral filter did run in constant-time, then the computational intensity would not grow with the size of the kernel.

A bilateral filter has the property of edge preserving and is widely used in image processing tasks, such as denoising, texture editing and relighting, tone management, demosaiking, stylization, optical-flow estimation, and stereo matching. Typically, noise filtering replaces a given pixel value with an average of similar and nearby pixel intensity values. A bilateral filter typically includes a range filter combined with a spatial domain filter. Spatial filtering enforces spatial closeness by weighing pixel values with coefficients that fall off with spatial distance. A range filter, on the other hand, assigns greater coefficients to neighboring pixels with light intensity that is more similar to the center pixel value. Therefore, the original intensity value at a given pixel would be better preserved because of the range filtering. Range filtering, alone, is typically not used for edge preserving because pixel values that are far away from a given pixel should not contribute to the new pixel value.

As stated above, a bilateral filter generally is not a constant-time filter because it typically includes a range filter and a spatial filter. However, constant time bilateral filtering is accomplished, according to embodiments described herein, by applying a plurality of constant time spatial filtering on a plurality of corresponding transformed images, where the plurality of transformed images depends on the number of pixel values, such as gray levels, of an input image. Then, for each pixel, the correct bilateral filtering value is picked out from the constant time spatial filtering values based on the intensity value of the input image.

In sum, bilateral filtering, according to embodiments described herein, can run in constant time regardless of the filter kernel size. This can be accomplished by decomposing the bilateral filter into a number of constant time spatial filters. Moreover, median filtering can also run in constant time. This can be accomplished by decomposing the median filter into a number of constant time box filters.

FIG. 1 is a block diagram of a system 100 for filtering an image 105, in accordance with one embodiment of the present invention. System 100 includes a receiver 110, a bilateral filter 120, a quantizer 140 and a filter value selector 170. Moreover, it should be appreciated that system 100 may include additional components that are not shown so as to not unnecessarily obscure aspects of the embodiments of the present invention.

The receiver 110 is configured to receive an image 105 having a plurality of pixels. In one embodiment, the image 105 is a frame of a plurality of frames in a video. In another embodiment, the video is a streaming video.

The bilateral filter 120 includes a pixel value range determinor 130 and a spatial filter 150. The bilateral filter is configured to bilaterally filter image 105 into filtered image 180. In one embodiment, the bilateral filter 120 is a constant time bilateral filter. In another embodiment, the bilateral filter 120 runs in real time. For example, 300 frames per second for a 1 MB image. In another embodiment, the spatial filter is or includes a constant time box filter 160. In another embodiment, the spatial filter is a Gaussian filter. It should be appreciated that system 100 can be implemented in parallel on a Graphics Processing Unit (GPU), because the main computation is done on a plurality of constant time spatial filters.

The pixel value range determinor 130 is configured to determine the range of pixel values of the plurality of pixels within the spatial filter kernel 155. It should be appreciated that a pixel value can describe how bright a pixel is, and/or what color the pixel is. Accordingly, it should be appreciated that a pixel value can be, but is not limited to the gray scale of a pixel, the intensity of a pixel, color value(s) of a pixel or a color intensity of a pixel. For example, the intensity values of a pixel in a grayscale image can range from 0 to 255. If the plurality of the pixels in the image 105 had every pixel value from 0 to 255, then the range of pixel values would be 0 to 255 for a total of 256 different pixel values within the image 105.

The spatial filter 150 includes a spatial filter kernel 155. The spatial filter 150 is configured to spatially filter at least one pixel within the spatial filter kernel 155. In one embodiment, the spatial kernel size is adjustable or resizable and accordingly does not affect the computational intensity. For example, if image 105 is of a person, the spatial kernel can be applied to only the face of the person in order to filter all of the pixels that make up the face of the person within the image. The size of spatial kernel could subsequently be adjusted to include the entire person in order to filter all of the pixels that make up the entire person within the image. Consequently, the computational intensity would be the same for either kernel size. In one embodiment, the kernel size is adjusted manually. In another embodiment, the spatial filter kernel 155 includes all of the pixels of image 105. For example, the spatial kernel can be applied to the entire image in order to filter all of the pixels of the image.

In one embodiment, all of the pixels in image 105 are selected within the spatial filter kernel 155 to be filtered by system 100. The pixel value range determinor 130 determines that all of the pixel values within image 105 range between 0 and 255 yielding 256 different pixel values. The spatial filter 150 performs spatial filtering on a target pixel for each of the 256 different pixel values and the calculated 256 different filtering values 165 are saved. The target pixel can only have one pixel value, e.g. 15, and the filter value selector 170 selects the filtering value that corresponds to a pixel value of 15 for the target pixel. If a subsequent target pixel has a pixel value of 20, then the filter value selector 170 selects the filtering value that corresponds to a pixel value of 20.

The quantizer 140 is configured to quantize the bilateral filter. In one embodiment, the quantizer 140 quantizes the range of pixel values of the plurality of pixels within the spatial filter kernel 155. In another embodiment, the quantization is performed by manually reducing the number of gray levels. In other words, the quantization reduces the number of transformed images to which the spatial filtering will be applied. Thus, manually reducing the number of gray levels is equal to the quantization of the bilateral filter computed based on the image intensities. For example, if the pixel value range was 0 through 255 for a total of 256 pixel values, the range of pixel values could be quantized down to only 8 out of the total 256 pixel values. Therefore, the bilateral filtering result uses only 8 out of the total 256 pixel values. In one embodiment, the quantization achieves a high peak signal-to-noise ratio (PSNR). For example, a PSNR over 49 dB.

It should be appreciated that embodiments of the present invention can also be described as follows. It should be appreciated that the following references and/or equations are examples only and embodiments of the present invention should not be construed as limited by such examples.

As stated above, a bilateral filter generally contains both a spatial filter kernel and a range filter kernel and does not run in constant time. A constant time bilateral filtering is accomplished by decomposing the bilateral filter into a number of box filters.

Denote p as a pixel in an image, q as another pixel in the neighborhood $N_p$ of p, $I_p$ and $I_q$ as the corresponding range values of pixels p and q, the filtered value of p is:

$$I_p^B = \frac{\sum_{q \in Np} (F(p, q) \cdot G(I_p, I_q) \cdot I_q)}{\sum_{q \in Np} (F(p, q) \cdot G(I_p, I_q))}, \qquad (1)$$

where F and G are the spatial and range filter kernels, respectively, in a standard bilateral filter.

If the spatial filter is assumed to be box filter F(p,q)=1, the resulting filter is:

$$I_p^B = \frac{\sum_{q \in Np} G(I_p, I_q) \cdot I_q}{\sum_{q \in Np} G(I_p, I_q))}, \qquad (2)$$

where the spatial filter is a constant. In other words, the values are constant over the spatial filter.

Assuming that $I_I \in \{0, 1, \ldots, N-1\}$, from Equation 2 the following is obtained:

$$I_p^B = J_p^B(I_p). \qquad (3)$$

The spatial filtering result is $$J_p^B(k) = \frac{\sum_{q \in Np} G(k, I_q) \cdot I_q}{\sum_{q \in Np} G(k, I_q)}. \qquad (4)$$

It should be appreciated that for Equation 4, the quantization parameter is k and that $I_q$, the intensity of the input image, is not quantized.

It should be appreciated that $$J_p^B(k) = \frac{\sum_{q \in Np} W_q(k) I_q(k)}{\sum_{q \in Np} W_q(k)}. \qquad (5)$$

It should be appreciated that $$J_p^B(k) = \frac{\sum_{q \in Np} J_q(k)}{\sum_{q \in Np} W_q(k)}, \qquad (6)$$

where $$\sum_{q \in Np} J_q(k)$$

is the spatial filtering of the input image and $$\sum_{q \in Np} W_q(k)$$

is the spatial filtering of the range filtering coefficient.

It should be appreciated that $k \in \{0, 1, \ldots, N-1\}$ is one of the possible gray levels, $W_q(k) = G(k, I_q)$ is the value of pixel q in a new image W(k) computed based on the intensity k and the original image I, and $J_q(k)=W_q \cdot I_q = G(k,I_q) \cdot I_q$ is the value of the pixel q in another image J(k) computed based on $W_q(k)$ and the original image I. W is denoted as the weighting image and J as the source image.

Equation 3 shows that box bilateral filtering can be decomposed into 2×N box filtering on 2×N images (J(k) and W(k)) computed from the original image I as presented in Equation 6. Several constant time box filtering methods are available, e.g., using integral image or summed area table. Hence, by decomposing the bilateral filter into a number of box filters, bilateral filtering can also be computed in constant time.

In one embodiment, the bilateral filtering is accomplished in real time when the intensity range is quantized. Assume only M out of N gray levels are selected. Accordingly, only M weighting images W and M source images J will be used. In Equation 6, the quantization of the gray level range means that the weighting image W will be quantized during the computation. However, the information of the original image I won't be lost. After quantization, the correct bilateral filtering value cannot be computed using Equation 3. Instead, assume the intensity value of the original image at pixel p is $k-1 \leq I_p \leq k$, where k is one of the selected intensity levels, the bilateral filtering value at pixel p can then be interpolated form the box filtering values $J^F(k)$ and $J^F(k+1)$:

$$I_p^B = (k+1-I)J_p^B(k) + (I_p-k)J_p^B(k+1). \quad (7)$$

In one embodiment, there are no constraints on a range filter kernel. For example, the range filter kernel can be any arbitrary filter. In another embodiment, a Gaussian filter is used. In one embodiment, the Gaussian filter can be represented as $$G(I_p, I_q) = \exp\left(-\frac{(I_p - I_q)^2}{2\sigma^2}\right), \quad (8)$$

where σ is used to control how much an adjacent pixel is downweighted because of the intensity difference.

Figure 2:
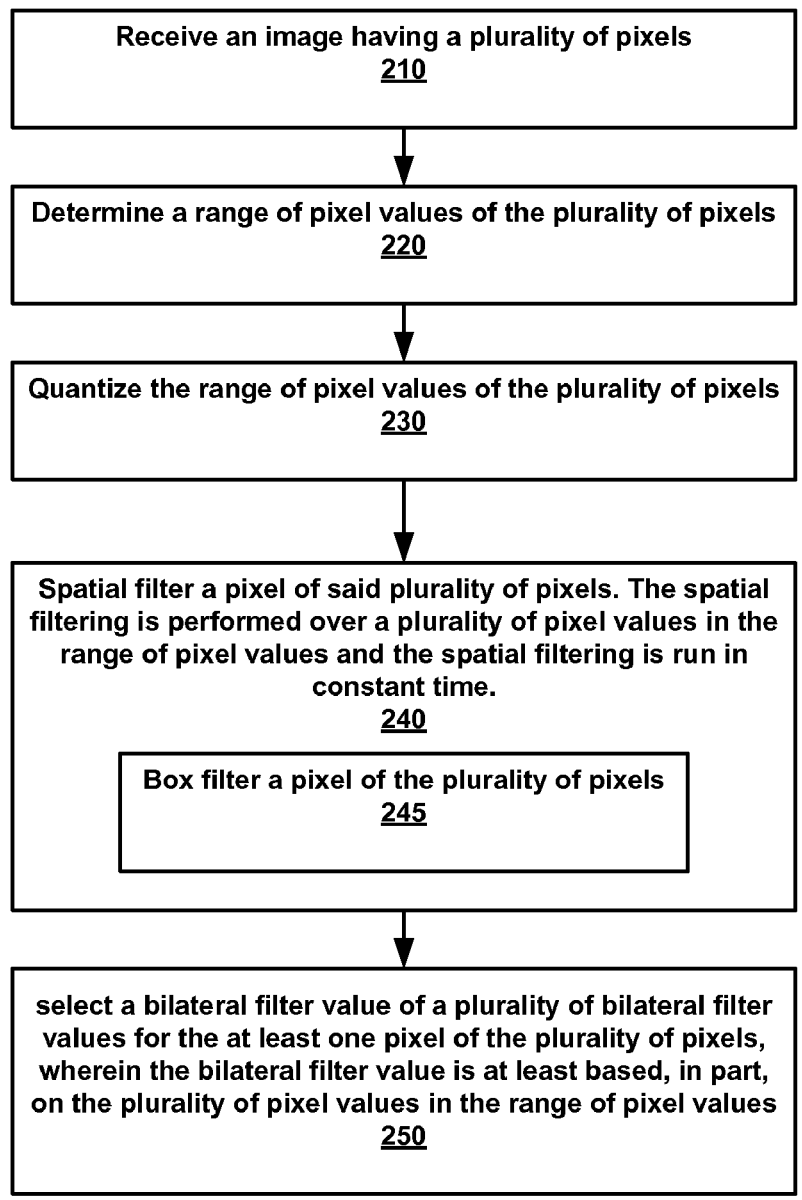
FIG. 2 illustrates an example of a flow chart of a method for bilateral filtering, in accordance with an embodiment of the present invention.

FIG. 2 is a flowchart illustrating a process 200 for filtering an image, in accordance with one embodiment of the present invention. In one embodiment, process 200 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, process 200 is performed by system 100 of FIG. 1. In another embodiment, process 200 is performed in constant time on a Graphics Processing Unit (GPU).

At block 210, an image is received. The image has a plurality of pixels. In one embodiment, the image is a frame of a video. In another embodiment, the video is a streaming video.

At block 220, a range of pixel values of the plurality of pixels is determined. In one embodiment, the range of pixel values is all of the pixel values in the image. For example, if the spatial kernel is applied to the entire image, then range of pixel values will be all of the pixel values within the image. The size of spatial kernel could subsequently be adjusted to include the entire person in image 105. In another embodiment, the range of pixel values are the pixel values within a filter kernel. For example, if the filter is applied to only a portion of the image, then the range of pixel values will be the pixel values within the filter kernel.

At block 230, the range of pixel values are quantized. For example, if the pixel value range is 0 through 255 for a total of 256 pixel values, the range of pixel values can be quantized down to only 8 out of the total 256 pixel values. Therefore, the bilateral filtering result uses only 8 out of the total 256 pixel values. In one embodiment, the quantization of the range of pixel values is determined manually. In another embodiment, the range of pixel values are not quantized. For example, if the pixel value range is 0 through 255 for a total of 256 pixel values, the range of pixel values are not quantized and the bilateral filtering result uses the 256 pixel values.

At block 240, a spatial filter is performed on a pixel of the plurality of pixels. The spatial filter is performed over a plurality of pixel values in the range of pixel values. In one embodiment, the bilateral filter is run in constant time. It should be appreciated that the spatial filter generates a spatial filter value for each pixel value in the range of pixel values.

At block 245, in one embodiment, the spatial filter is a box filter that is performed on a pixel of the plurality of pixels. The box filter is performed over a plurality of pixel values in the range of pixel values. For example, the box filter performs box filtering on a target pixel for each of the different pixel values and the box filtering values are saved for subsequent use. It should be appreciated that Equation 2, above, refers to the spatial filter being a box filter.

At block 250, a bilateral filter value of a plurality of bilateral filter values for the at least one pixel of the plurality of pixels is selected, wherein the bilateral filter value is at least based, in part, on the plurality of pixel values in the range of pixel values.

Figure 3:
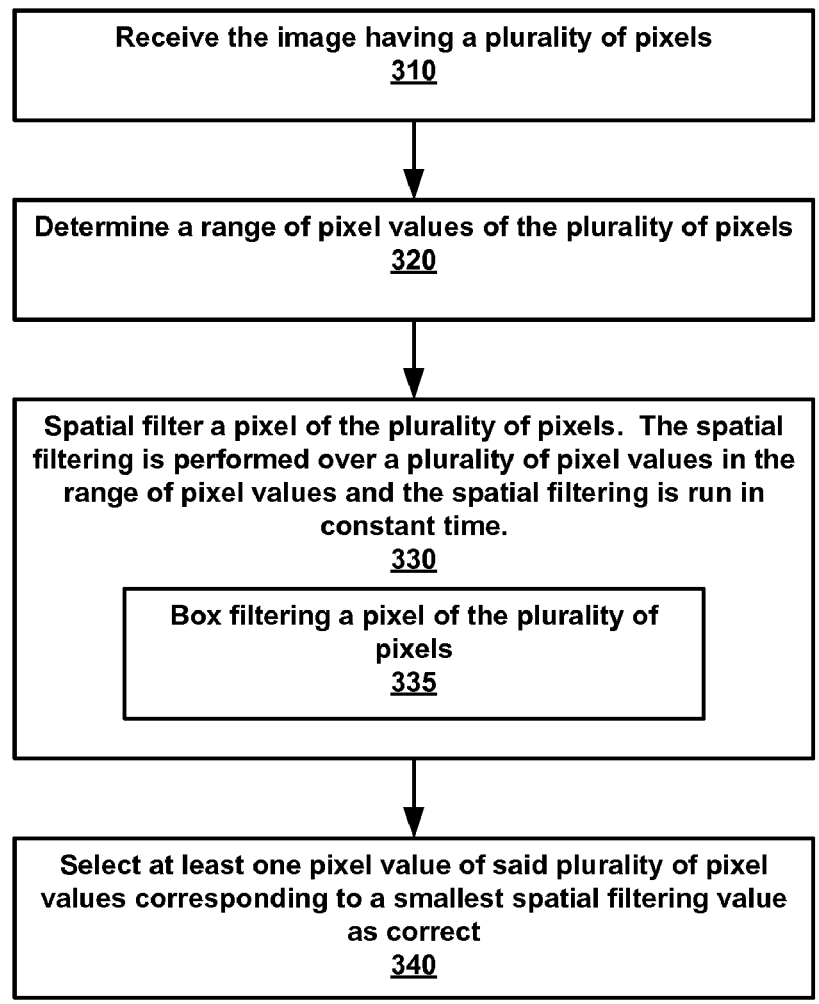
FIG. 3 illustrates an example of a flow chart of a method for median filtering, in accordance with an embodiment of the present invention.

FIG. 3 is a flowchart illustrating a process 300 for filtering an image, in accordance with one embodiment of the present invention. In one embodiment, process 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, process 300 is performed in constant time on a GPU. It should be appreciated that the decomposition process used for bilateral filtering can be applied to median filtering.

At block 310, an image is received. The image has a plurality of pixels. In one embodiment, the image is a frame of a video. In another embodiment, the video is a streaming video.

At block 320, a range of pixel values of the plurality of pixels are determined. In one embodiment, the range of pixel values are all of the pixel values in the image. In another embodiment, the range of pixel values are the pixel values within a filter kernel.

At block 330, spatial filtering is performed on a pixel of the plurality of pixels. The spatial filtering is performed over a plurality of pixel values in the range of pixel values. In one embodiment, the spatial filtering is constant time box filtering. It should be appreciated that the median filter is run in constant time. At block 335, in one embodiment, a box filter is performed on a pixel of the plurality of pixels, wherein the box filter is performed over a plurality of pixel values in the range of pixel values.

At block 340, at least one pixel value of the plurality of pixel values corresponding to a smallest spatial filtering value is selected as correct.

It should be appreciated that embodiments of the present invention can also be described as follows. It should be appreciated that the following references and/or equations are examples only and embodiments of the present invention should not be construed as limited by such examples.

As stated above, the decomposition method used for bilateral filtering can also be applied to median filtering. Accordingly, it can be assumed that $$\text{sign}(x) = \begin{cases} -1 & x < 0 \\ 0 & x = 0 \\ 1 & x > 0 \end{cases} \quad (9)$$

and the intensity value is also in $\{0, 1, \ldots, N-1\}$, the median filtering value of a pixel p can be then expressed as:

$$M_p(k) = \left| \sum_{q \in N_p} \text{sign}(k - I_q) \right| = \left| \sum_{q \in N_p} Q_p(k) \right|, \quad (10)$$

$$I_p^M = \underset{i \in \{0,1,\ldots,N-1\}}{\text{argmin}} M_p(i). \quad (11)$$

Equations 10 and 11 show that the median filtering is separated into two steps. First, box filter is applied to N number of new source images Q computed based on k and the original image I. The absolute value of the box filtering results is computed as images M(k). Second, for each pixel, the intensity hypothesis $i \in \{0, 1, \ldots, N-1\}$ corresponding to the minimum pixel values of the images M(i) is selected as correct. Only the first step relies on the filter size. The median filtering is run in constant time because the box filtering is run in constant time.

Various embodiments of the present invention, constant time image filtering, are thus described. While the present invention has been described in particular embodiments, it should be appreciated that the present invention should not be construed as limited by such embodiments, but rather construed according to the following claims.

What is claimed is:

1. A system for filtering an image using a bilateral filter, said system comprising:
   a receiver, for receiving an image, said image having a plurality of pixels; and
   a bilateral filter, wherein said bilateral filter is run in constant time and comprises:
      a pixel value range determinor configured to determine a range of pixel values of said plurality of pixels; and
      a spatial filter configured to spatially filter at least one of said plurality of pixels, wherein said spatial filter is further configured to perform over a plurality of pixel values in said range of pixel values; and
      a filter selector configured to select a bilateral filter value of a plurality of bilateral filter values.

2. The system of claim 1, wherein said filter selector selects a bilateral filter value of a plurality of bilateral filter values based on said plurality of pixel values in said range of pixel values.

3. The system of claim 1, wherein said image is a frame of a video stream.

4. The system of claim 1, wherein said spatial filter is a box filter.

5. The system of claim 1, wherein said bilateral filter comprises:
   a quantizer configured to quantize said bilateral filter.

6. The system of claim 5, wherein said quantizer is configured to quantize said range of pixel values of said plurality of pixels.

7. The system of claim 1, wherein said range of pixel values is selected from a group consisting essentially of: color and intensity value.

8. The system of claim 1, wherein said spatial filter comprises:
   an adjustable filter kernel size.

9. The system of claim 1, wherein said bilateral filter is run in real time.

10. A computer-implemented method for filtering an image using a bilateral filter, said method comprising:
    receiving said image, said image having a plurality of pixels;
    determining a range of pixel values of said plurality of pixels;
    spatial filtering at least one pixel of said plurality of pixels, wherein said spatial filtering is performed over a plurality of pixel values in said range of pixel values and wherein said spatial filtering is run in constant time; and
    selecting a bilateral filter of a plurality of bilateral filter values for said at least one pixel of said plurality of pixels.

11. The method of claim 10, wherein said receiving said image comprises:
    receiving a frame of a video stream.

12. The method of claim 10 further comprising:
    quantizing said bilateral filter.

13. The method of claim 10 further comprising:
    quantizing said range of pixel values of said plurality of pixels.

14. The method of claim 10, wherein said bilateral filter value is at least based, in part, on said plurality of pixel values in said range of pixel values.

15. The method of claim 10, wherein said range of pixel values is selected from a group consisting essentially of: color and intensity value.

16. The method of claim 10, wherein said spatial filtering comprises:
    box filtering.

17. The method of claim 10, wherein said spatial filter comprises:
    a spatial filter kernel having a size, wherein said size of said spatial filter kernel is resizable.

18. A computer-implemented method for filtering an image using a median filter, said method comprising:
    receiving said image, said image having a plurality of pixels;
    determining a range of pixel values of said plurality of pixels;
    spatial filtering a pixel of said plurality of pixels, wherein said spatial filtering is performed over a plurality of pixel values in said range of pixel values and wherein said spatial filtering is run in constant time; and
    determining as correct at least one pixel value of said plurality of pixel values corresponding to a smallest spatial filtering value.

19. The method of claim 18, further comprising:
    selecting at least one pixel value of said plurality of pixel values corresponding to a smallest spatial filtering value as correct.

20. The method of claim 18, wherein said spatial filtering comprises:
    box filtering.

* * * * *